UNITED STATES PATENT OFFICE.

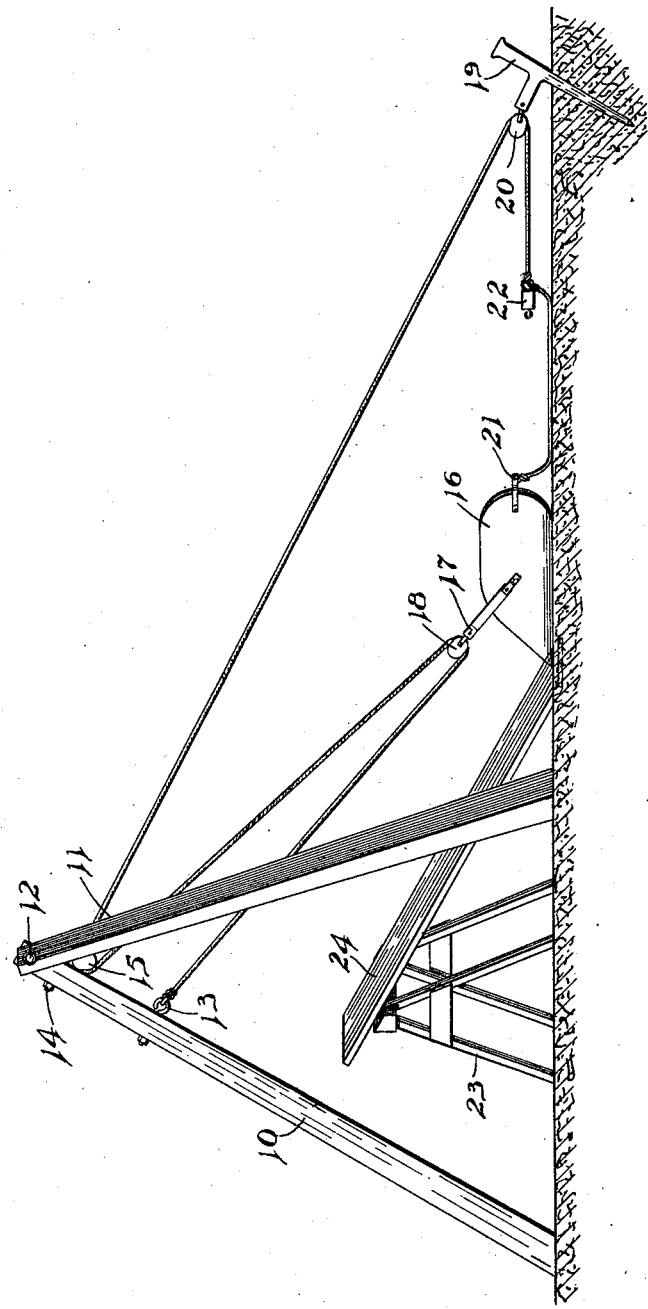

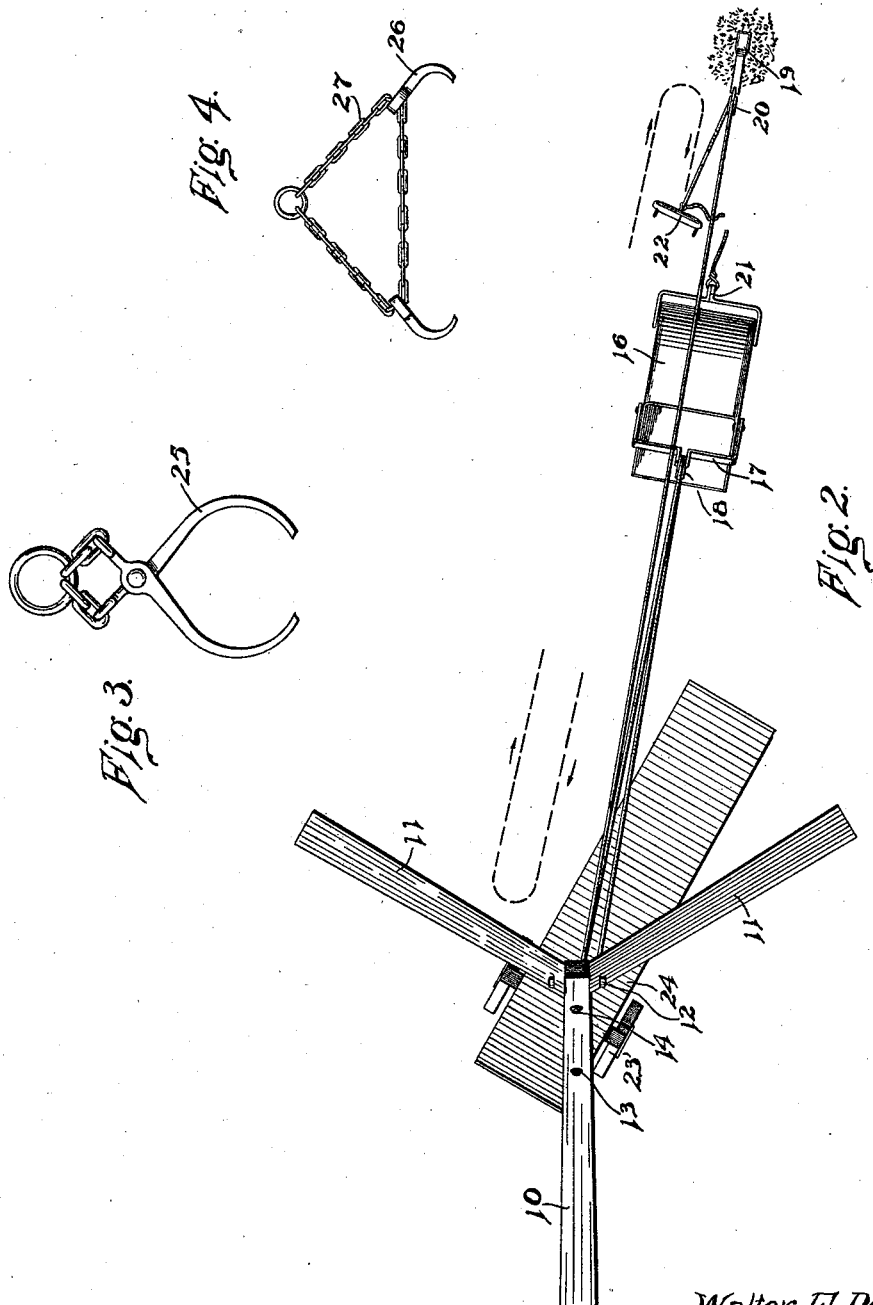

WALTER E. POTTS, OF SANTA FE, TENNESSEE.

AUTOMATIC WAGON-LOADER.

1,000,844.   Specification of Letters Patent.   Patented Aug. 15, 1911.

Application filed September 20, 1909.   Serial No. 518,551.

*To all whom it may concern:*

Be it known that I, WALTER E. POTTS, a citizen of the United States, residing at Santa Fe, in the county of Maury, State of Tennessee, have invented certain new and useful Improvements in Automatic Wagon-Loaders; and I do hereby declare the following to be a full, clear, and exact description of the invention, such as will enable others skilled in the art to which it appertains to make and use the same.

This invention relates to wagon loaders and has special reference to an automatic loader wherein a draft animal is employed both for the purpose of hoisting and for overhauling the fall prior to a second hoist.

Briefly stated the invention consists of a suitable derrick, an inclined platform located below the derrick, a scoop, a runner movably attached to the rear end of said scoop, a ground stake properly positioned from the derrick and platform, and a rope one end of which is attached to the derrick and passing over a suitable block attached to the scoop, the ground stake and scoop, the opposite end of said rope having its end secured to said derrick below the block thereon, the ground stake being so positioned in respect to the platform as to cause the receiving end of the scoop to advance on a line with one corner of said platform, whereby the load carried by the scoop is readily elevated and deposited from the opposite upper corner of the platform.

The invention has for its object to provide a device of this kind so arranged that the ordinary hand method of overhauling the hoisting fall common in such devices will be eliminated.

With the above and other objects in view the invention consists in general of the combination with a material holding means, of a hoisting fall attached to said means and having its free end also secured to said means, and other means for attaching a draft animal secured to the running part of said fall so that the animal can pull the material holding means in either direction.

The invention further consists in certain novel details of construction and combinations of parts hereinafter fully described, illustrated in the accompanying drawings, and specifically set forth in the claim.

In the accompanying drawings, like characters of reference indicate like parts in the several views, and:—Figure 1 is a side elevation of a hoisting device constructed in accordance with this invention. Fig. 2 is a top plan view thereof. Fig. 3 shows a modified form of material holding means. Fig. 4 shows a second modified form of material holding means.

The frame for this hoist consists of a front timber 10 and lateral or rear timbers 11 which are bolted together at the top by means of a bolt 12 and have the bottoms of the legs spread apart so that there is formed a species of tripod.

At 13 is an eye bolt which passes through the front timber 10 and is secured thereto by means of a suitable nut. At 14 is a similar eye bolt whereto is secured a single sheave block 15.

In the form of material holder shown in Fig. 1 there is provided the ordinary scoop 16 having a bail 17 and hooked to this bail is a single sheave block 18. Suitably positioned at some distance from the tripod is a ground stake 19 whereto is secured a single sheave block 20. A rope extends from the eye bolt 13 through the block 18, thence through the block 15 and thence through the block 20 and the free end of this rope is connected to the hoisting means as indicated at 21. For the purpose of distinguishing the various parts of this rope during the description the portion extending from the eye bolt 13 to the block 18 will be known as the standing part while the portion between the attachment of the end at 21 and the block 20 will be known as the running part. Attached to the running part of the rope in spaced relation to the material holding means is a swingletree 22. It is found advisable that the distance from the point 21 to the swingletree shall be equal to the extreme distance which it is required to move the scoop 16 and to this end the ground stake 19 should be positioned at least twice the distance from the center of the tripod that is required for the extreme movement of the scoop 16. The reason for this will be obvious when it is considered that the draft animal must move two feet for every foot of movement of the scoop since the hoisting fall thus constructed is what is known as a single fall. In order to run the material up into a wagon it is preferred that there shall be a trestle 23 positioned beneath the tripod and on this trestle is supported one end of an inclined frame 24 up which the scoop may pass.

In the forms of material holding devices shown in Fig. 3 and Fig. 4 there is provided in the first instance a device for grasping such material as ice and comprising a pair of tongs 25 while in the latter instance there is provided a pair of logging hooks 26 connected by the usual chain 27 for the purpose of moving logs and other heavy timbers. It is obvious that without disturbing the arrangement of the hoisting fall the hooks or the tongs could readily be substituted for the scoop 16 and the operation remain the same.

In the operation of this device let it be supposed that it is desired to move material from a point sixty feet distant from the center of the tripod to the center of said tripod. In order to do this the ground stake 19 is positioned at least one-hundred and twenty feet distant and the swingletree or other draft device is attached sixty feet to the rear of the scoop 16. Now, the animal is driven forward in the direction of the tripod and as the animal walks the one-hundred and twenty feet that will bring him beneath the tripod the scoop will have moved sixty feet at the same time. Meanwhile the running part of the rope will have slackened up between the scoop and the draft device so that slack equal to sixty feet will be left between the animal and the scoop when the limit of forward travel of the scoop is reached. The animal is then turned around and driven backward. In the first sixty feet he has a period of rest but at the end of this time the rope between the scoop and the draft device becomes taut and during the next sixty feet the scoop will be pulled backward and overhaul the fall as the block 18 runs down on the standing part of the rope. At the end of the next sixty feet of travel the animal will be in precisely his original place as will also the scoop. By arranging the ground stake 19 in the position in respect to the inclined platform 24 as clearly shown in Fig. 2 and previously referred to, the load carried by the scoop 16 is elevated to the upper corner of said platform where the load can be conveniently and readily deposited into the wagon from one side of said platform. The animal is again turned around and the operation repeated, this being done as many times as may be necessary to load the wagon, the scoop passing up the incline and being dumped at the end thereof on each forward travel. It is obvious that logs might be hauled up the incline or ice may be conveyed therealong in the same manner and it is also obvious that in order to increase the distance of the haul it is merely necessary to maintain the relation between the distances the material is to be moved and the distance between the center of the tripod and the ground stake 19.

There has thus been provided a simple and efficient device of the kind described and for the purpose specified.

Having thus described the invention, what is claimed as new, is:—

A device of the character described comprising a suitable derrick, a fixed inclined platform positioned within the latter with its lower receiving end extending beyond the derrick, a stake anchored at a suitable distance from the derrick, a pulley attached to said anchor, a movable scoop having a pulley attached thereto, a runner, one end of which is attached to the rear closed end of the latter, a draft appliance, comprising a rope, one end of which is attached to the opposite end of the runner and passing over the pulley attached to the anchor, and over a suitable pulley on the derrick and a pulley movably carried by the scoop, the opposite end of the said rope being secured to the derrick thus constructed.

In testimony whereof, I affix my signature, in presence of two witnesses.

WALTER E. POTTS.

Witnesses:
 WILLIAM W. PAGE,
 JACOB G. GARDNER.

---

Copies of this patent may be obtained for five cents each, by addressing the "Commissioner of Patents, Washington, D. C."